(12) United States Patent
Regan et al.

(10) Patent No.: US 7,088,506 B2
(45) Date of Patent: Aug. 8, 2006

(54) COMPACT SPOTTING SCOPE WITH SIDE FOCUS CONTROL

(75) Inventors: Rick R. Regan, Aloha, OR (US);
Rodney H. Otteman, Aloha, OR (US);
Erik R. Halverson, Salem, OR (US)

(73) Assignee: Leupold & Stevens, Inc., Beaverton, OR (US)

( * ) Notice: Subject to any disclaimer, the term of this patent is extended or adjusted under 35 U.S.C. 154(b) by 33 days.

(21) Appl. No.: 10/425,057

(22) Filed: Apr. 28, 2003

(65) Prior Publication Data

US 2004/0212878 A1    Oct. 28, 2004

(51) Int. Cl.
*G02B 23/00* (2006.01)
(52) U.S. Cl. .................. 359/425; 359/399; 359/431
(58) Field of Classification Search .............. 359/402, 359/408, 409, 431, 399, 405, 410, 831, 407, 359/425, 426; D16/132, 130; 42/119
See application file for complete search history.

(56) References Cited

U.S. PATENT DOCUMENTS

| | | | | |
|---|---|---|---|---|
| 2,051,050 | A | * | 8/1936 | Langsner .................. 359/426 |
| 4,080,043 | A | | 3/1978 | Altenheiner et al. ........ 359/416 |
| 4,643,542 | A | | 2/1987 | Gibson ..................... 359/424 |
| 4,669,833 | A | | 6/1987 | Mise ........................ 359/420 |
| D347,441 | S | | 5/1994 | Lutter et al. .............. D16/132 |
| 5,321,547 | A | * | 6/1994 | Zapp ........................ 359/431 |
| 5,604,630 | A | * | 2/1997 | Palmer ..................... 359/409 |
| 5,615,049 | A | * | 3/1997 | Kaneko et al. ............. 359/684 |
| 5,644,426 | A | * | 7/1997 | Hotta ....................... 359/409 |
| D395,440 | S | | 6/1998 | Ogasawara et al. ........ D16/132 |
| 5,866,048 | A | | 2/1999 | Van Domelen et al. ...... 264/2.5 |
| 6,005,711 | A | | 12/1999 | Mai et al. ................... 359/424 |
| 6,178,052 | B1 | * | 1/2001 | Aoki et al. ................. 359/730 |
| D439,259 | S | | 3/2001 | Yamaguchi ................ D16/132 |
| 6,295,754 | B1 | * | 10/2001 | Otteman et al. .............. 42/124 |
| 6,351,907 | B1 | | 3/2002 | Otteman ...................... 42/120 |

OTHER PUBLICATIONS

Pentax, Spotting Scope PF-80ED Owner's Manual.
American Technologies Network Corporation, NightStorm Waterproof Night Vision Diving Scope, http://www.southwestweapons.com/atn_nightstormyellow.html, visited Feb. 18, 2003.
Burris Optics, Spotting Scopes, http://www.burrisoptics.com/spottingscope.html, visited Feb. 18, 2003.

* cited by examiner

*Primary Examiner*—Arnel C. Lavarias
(74) *Attorney, Agent, or Firm*—Stoel Rives LLP

(57) ABSTRACT

A compact spotting scope includes a housing with an outer surface having a grasping region sized and shaped to fit in the palm of a user's hand so that the spotting scope can be held at eye level with one hand in an ergonomic arm and wrist position for steady support. An optical element positioned within the housing is adjusted by manually rotating a side-mounted adjustment knob that extends laterally from the outer surface of the housing opposite the grasping region. The side-mounted position of the adjustment knob allows the arm and wrist of the focusing hand to be maintained in an ergonomic position during manipulation of the adjustment knob, thereby further facilitating steady support. An internal support member of the spotting scope includes a frame portion and a generally tubular portion, which are preferably formed together of unitary one-piece construction for aligning optical elements of the spotting scope.

40 Claims, 6 Drawing Sheets

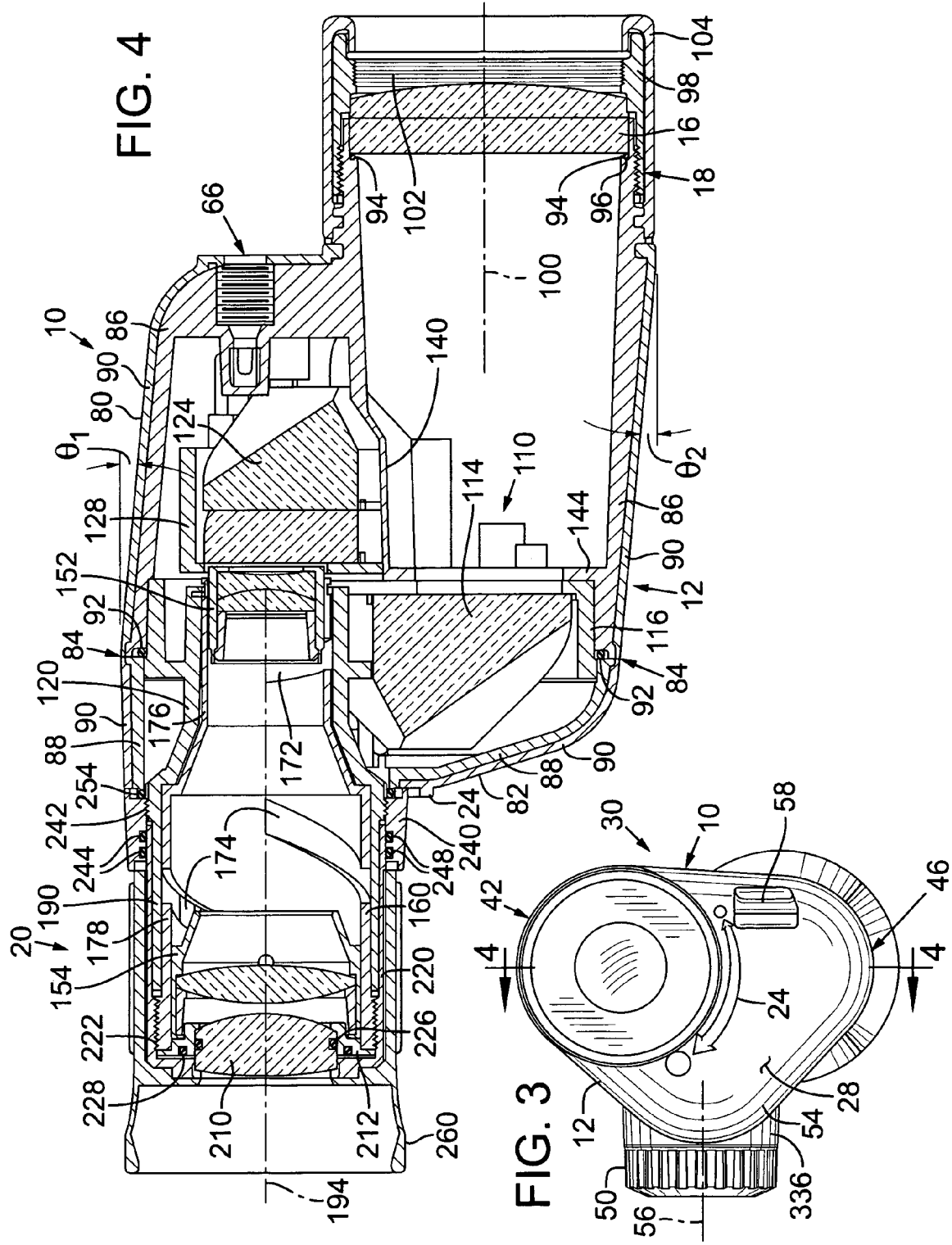

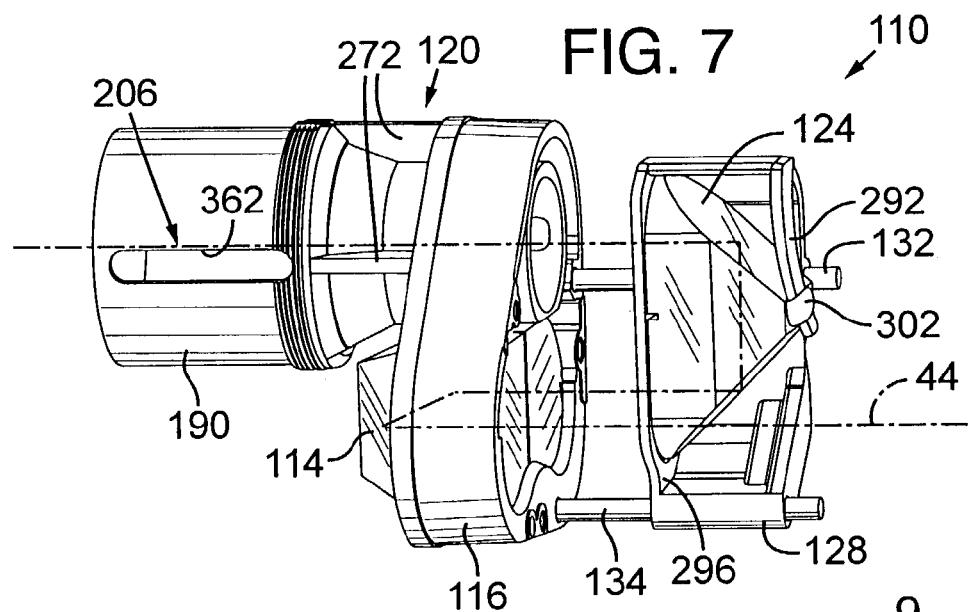
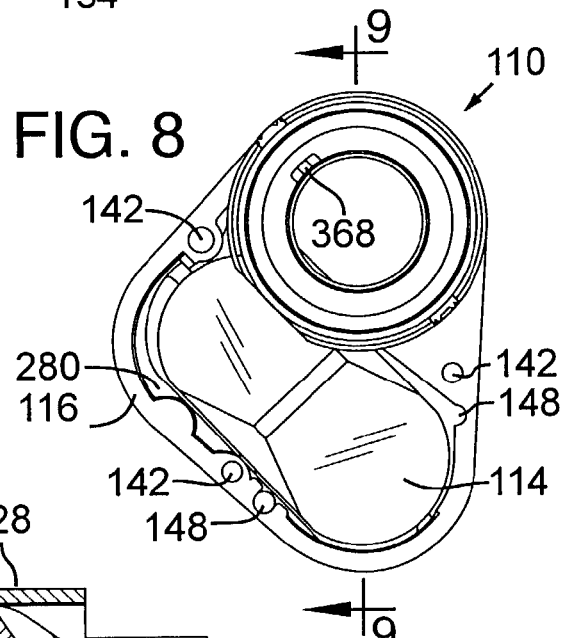
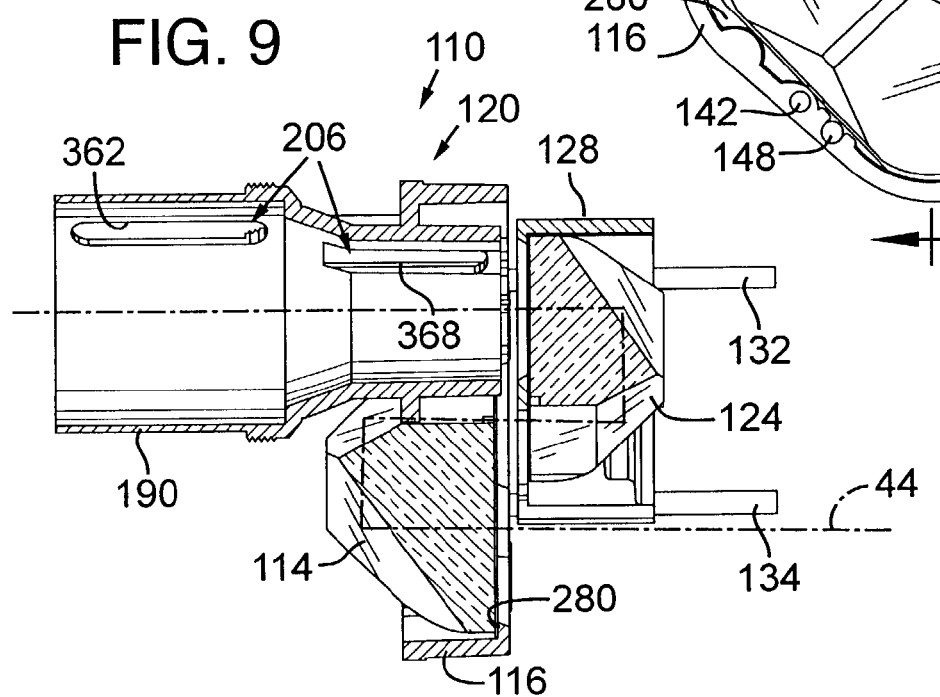

COMPACT SPOTTING SCOPE WITH SIDE FOCUS CONTROL

RELATED APPLICATIONS

U.S. patent application Ser. No. 29/180,735, filed Apr. 28, 2003, now U.S. Pat. No. D490,097, which is incorporated herein by reference.

TECHNICAL FIELD

The present invention relates to spotting scopes and, in particular, to a compact lightweight spotting scope having features to facilitate hand-held use.

BACKGROUND OF THE INVENTION

Spotting scopes are specialized optical telescopes used primarily for terrestrial observation, rather than astronomy, and which include a single optical path (monocular) and image-inverting optics. As compared to binoculars, spotting scopes typically have a higher optical power (usually magnifying between 12× and 60×), a narrower field of view, and a larger overall size and weight. While it is often desirable to have the increased optical power of a spotting scope, the relatively large size and weight of most known spotting scopes inhibits portability. The large size, relatively large mass, narrow field of view, and high optical magnification of such spotting scopes generally requires them to be supported on a tripod or other steady support for effective use. Moreover, most known spotting scopes have a limited operational focusing range that does not allow a user to focus on targets located closer than 30 feet (9.1 meters).

U.S. Pat. No. 4,669,833 of Mise illustrates in FIG. 2 a conventional focus adjustment mechanism used in spotting scopes, including a jack screw that extends through a housing of the scope. The jack screw has an axis of rotation aligned with an optical axis of the scope and is threadably engaged with a carriage that supports a prism inside the housing for linear movement along a pair of guide posts that are precisely aligned with the optical axis. A knob of the jack screw extends longitudinally from the housing and is manually rotated to drive the movable prism along the optical axis. A user rotates the jack screw knob by dragging a finger across the top of the knob or by reaching around the front of the knob to grasp it between the user's thumb and fingers—the latter motion being somewhat awkward. Rotation of the jack screw drives the carriage at a constant rate throughout the entire range of adjustment. The pitch of the jack screw threads is dictated by the fine adjustments required to achieve sharp focus as the focus setting approaches infinity. However, the present inventors have found that at closer focusing distances the effect of such fine adjustments are more subtle, which can make it difficult to quickly visually assess the effect of adjustments and determine the direction in which the jack screw should be turned to achieve sharp focus.

The present inventors have recognized a need for an improved spotting scope having a compact size, light weight, and an optical system that facilitates hand-held use, thereby eliminating or reducing the need for a tripod or other support device. A need has also been recognized by the present inventors for a spotting scope having an optical design that provides for improved close focus capabilities and a mechanical design that facilitates fast adjustment of the focus setting without compromising the user's ability to hold the spotting scope steady.

SUMMARY OF THE INVENTION

A compact spotting scope includes a housing supporting an optical system that defines a folded optical path within the housing. The optical system includes a movable optical element, which can be selectively displaced for adjusting an optical setting of the spotting scope, such as its focus. The spotting scope has a relatively light weight and small size to facilitate hand-held use. For example, a preferred embodiment weighs under 16 ounces (~450 g) and measures less than about 8 inches (~20 cm) long. Due to its relatively small size and weight, the compact spotting scope can be conveniently carried on a lanyard or other strap. It may also have a wider field of view and less magnification than a traditional spotting scope, to eliminate or reduce the need for a tripod or other steady support device. The housing is configured to fit in the palm of a user's hand and includes an outer surface having a grasping region positioned adjacent the folded optical path and sized so that the spotting scope can be held at eye level with one hand in an ergonomic arm and wrist position for steady support.

The spotting scope preferably includes a side-mounted adjustment knob operably coupled to the optical element for driving the optical element in response to rotation of the adjustment knob. The adjustment knob extends laterally from the outer surface of the housing opposite the grasping region and is sized so that the user can comfortably grasp and rotate the adjustment knob with his or her free hand. The side-mounted position of the adjustment knob allows the arm and wrist of the focusing hand to be maintained in an ergonomic position during manipulation of the adjustment knob, thereby further facilitating steady support of the spotting scope. The optical element may include an optical focusing element driven by the side-mounted adjustment knob for a variable rate of movement over the range of focus settings, by employing a mechanism such as the orbital drive pin of U.S. Pat. No. 4,643,542 of Gibson or the spiral cam of U.S. Pat. No. 6,351,907 of Otteman.

In some embodiments, the spotting scope includes optical elements that can be adjusted to vary the optical power (magnification) or other optical setting of the spotting scope. Power varying optical elements may include one or more groups of lenses movable along the optical path in response to rotation of an eyepiece assembly or objective lens tube of the spotting scope, for example.

A preferred embodiment implements a novel internal support member for accurate alignment and compact support of critical optical components of the spotting scope. The support member includes a frame portion and a generally tubular portion, which are preferably integrally formed together of unitary molded construction. The tubular portion has a longitudinal axis and at least one guide feature extending along the longitudinal axis. The guide feature guides a power-varying optical element or set of optical elements slidably mounted within the tubular portion, restricting rotation of the power-varying optical element while allowing movement along the longitudinal axis. In a preferred embodiment, a cam sleeve of the eyepiece assembly is operably coupled to the power-varying optical element so that rotation of the eyepiece assembly causes the power-varying optical element to move along the longitudinal axis to adjust the optical power (magnification) of the compact spotting scope. In alternative embodiments, the optical elements driven by the eyepiece assembly adjust a different optical setting of the spotting scope, such as a focus setting.

The frame portion of the support member includes a seat that rigidly supports an optical beam directing element, such as a porro prism, at a precise position relative to the tubular portion and a precise angular orientation relative to the longitudinal axis of the tubular portion. A second optical beam directing element, such as a movable porro prism, is preferably mounted on a carriage that is slidably supported on a pair of guide pins press-fit into the support member. The guide pins ensure precise alignment of the second optical beam directing element relative to the tubular portion and the first optical beam directing element. The integral frame portion and tubular portion of the support member provide a shared platform for alignment of the first and second optical beam directing elements with other parts of the optical system, such as the power-varying optical element. These critical optical components can be pre-assembled on the support member in precise alignment and tested before installation into the housing, thereby improving the optical performance of the compact spotting scope. Advantageously, the frame portion of the support member, the guide pins, and the carriage may be contained entirely within the housing so that the optical beam directing elements are somewhat isolated from the housing to protect the optical beam directing elements from shock and external stresses.

Additional aspects and advantages of the invention will be apparent from the following detailed description of preferred embodiments, which proceeds with reference to the accompanying drawings.

BRIEF DESCRIPTION OF THE DRAWINGS

FIG. 3 is an eyepiece end elevation view of the compact spotting scope of FIG. 1;

FIG. 4 is a cross section view of the compact spotting scope of FIG. 1 taken along lines 4—4 of FIG. 3;

FIG. 7 is a pictorial view of the assembled support member and prism assembly of FIG. 6 shown from a lower right vantage point;

FIG. 8 is an eyepiece end elevation view of the support member and prism assembly of FIG. 7; and FIG. 9 is a cross section view of the support member and prism assembly of FIG. 7 taken along lines 9—9 of FIG. 8.

In the figures, like reference numerals refer to same or similar parts or features.

DETAILED DESCRIPTION OF PREFERRED EMBODIMENTS

Throughout the specification, reference to "one embodiment," or "an embodiment," or "some embodiments" means that a particular described feature, structure, or characteristic is included in at least one embodiment. Thus, appearances of the phrases "in one embodiment" or "in an embodiment" or "in some embodiments" in various places throughout the specification are not necessarily all referring to the same embodiment or embodiments.

Furthermore, the described features, structures, and characteristics may be combined in any suitable manner in one or more embodiments. Those skilled in the art will recognize that certain embodiments may be practiced without one or more of the specific details, or with other methods, components, materials and features. In other instances, well-known structures, materials, or operations are shown in simplified form or omitted to avoid obscuring aspects of the embodiments.

Figure 1:
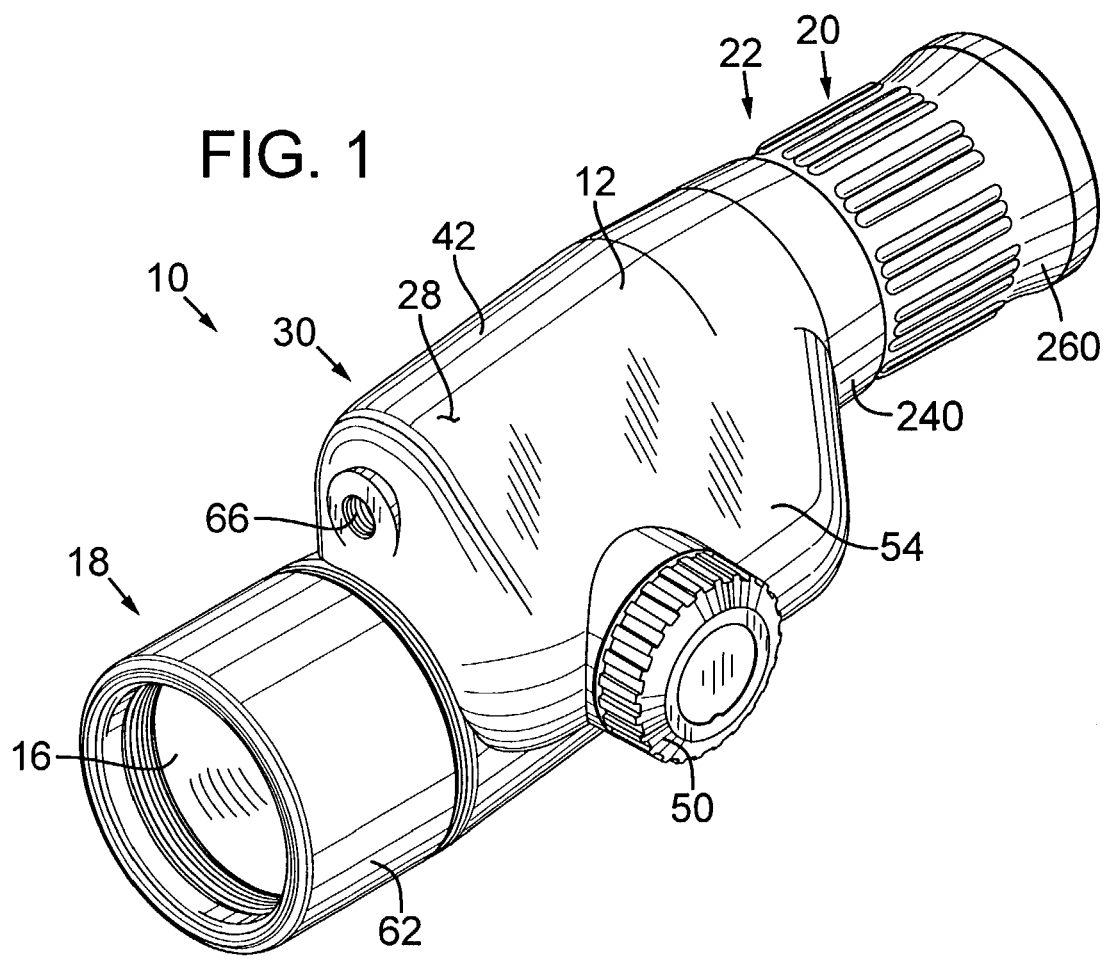
FIG. 1 is a pictorial view of a compact spotting scope in accordance with a preferred embodiment.

FIG. 1 is a pictorial view of a compact spotting scope 10 in accordance with a preferred embodiment. With reference to FIG. 1, spotting scope 10 includes a housing 12 within which an optical system is supported. An objective lens 16 of the optical system is supported at an objective end 18 of housing 12. An eyepiece assembly 20 is mounted at an eyepiece end 22 of housing 12 and is preferably rotatable for adjusting an optical setting of spotting scope 10, such as magnification. An arrow 24 and/or other indicia may be marked or otherwise displayed at eyepiece end 22 of housing to indicate to a user the direction in which to rotate eyepiece assembly 20 to increase or decrease the magnification setting or other optical setting of spotting scope 10.

Figure 2:
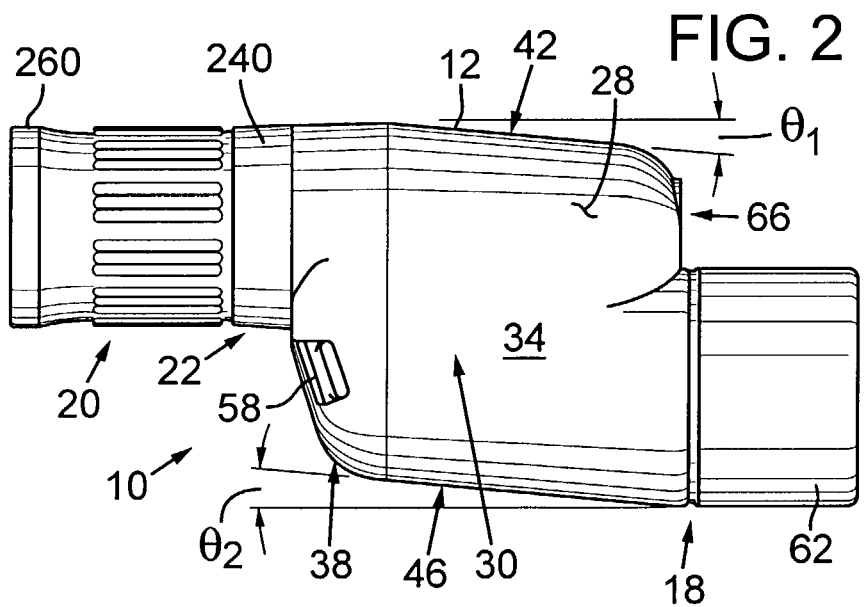
FIG. 2 is a right side elevation view of the compact spotting scope of FIG. 1.
Figure 10:
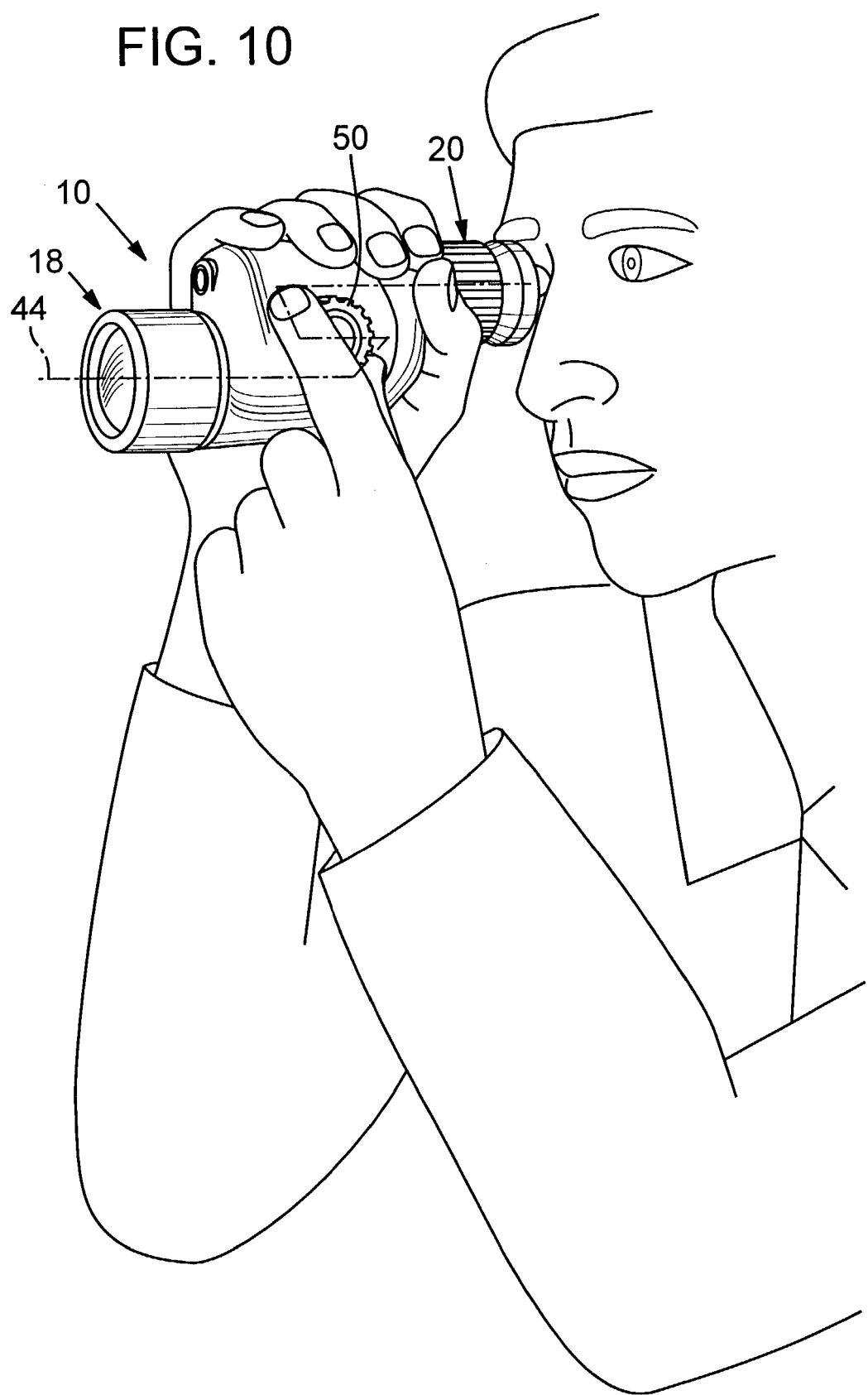
FIG. 10 is a pictorial view of the compact spotting scope of FIG. 1 in hand-held use.

FIGS. 2 and 3 are respective right side elevation and eyepiece end elevation views of spotting scope 10. With reference to FIGS. 1–3, an outer surface 28 of housing 12 includes a grasping region 30 configured to fit in the palm of a user's hand. Grasping region 30 includes a right side major surface 34 that spans generally between objective end 18 and eyepiece end 22 of housing. Grasping region 30 further includes a radiused lower corner 38 sized to comfortably nest in the concave portion of a user's right hand, between the fleshy part of the palm near the base of the thumb and the metacarpophalangeal joints, while the user's fingers extend along right side major surface 34 and over an upper ridge 42 of housing to comfortably grasp spotting scope 10 in one hand for steady support (FIG. 10). Housing 12 and, in particular, right side major surface 34 and upper ridge 42 are preferably sized and shaped so that one or more of the proximal interphalangeal joints of the user's right hand (and more preferably the 3rd through 5th proximal interphalangeal joints) can be smoothly curled about upper ridge 42 of housing when lower corner 38 of grasping region 30 is firmly seated against the concave region of the user's palm. For users with very small hands, the size of housing 12 may require curling of the distal interphalangeal joints around upper ridge 42.

FIG. 10 is a pictorial view of spotting scope 10 in use. In FIG. 10, a dashed line illustrates a folded optical path 44, which is defined by the optical system of spotting scope 10, as further described below with reference to FIGS. 6–7. Advantageously, containment of folded optical path 44 in housing 12 also results in housing 12 being sized and shaped so that outer surface 28 fits comfortably in one hand for stable and well-balanced support. The size and shape of grasping region 30 (FIGS. 2–3) facilitate an ergonomic arm and wrist position to reduce hand and arm fatigue and to inhibit shaking during hand-held use of spotting scope 10. The ergonomic arm and wrist position may include, for example, tucking the elbow against the torso or holding the elbow slightly away from the torso with the forearm in a substantially vertical position to provide, with the wrist and hand, a pedestal for comfortably supporting spotting scope 10 at eye level. In this position, with the objective end of the folded optical path oriented horizontally, upper ridge 42 preferably slopes at an angle $\theta_1$ (FIG. 2) relative to the horizontal and is inclined downwardly away from eyepiece end 22. The slope angle $\theta_1$ of upper ridge 42 is preferably inclined between 2 degrees and 10 degrees and more preferably approximately 5 degrees relative to horizontal section of folded optical path 44 extending through objective end 18. The slope of upper ridge 42 ergonomically fits the natural positions of the interphalangeal joints and provides purchase for comfortably and securely grasping spotting scope 10 with fingers curled around upper ridge 42. A lower ridge 46 of housing 12 has a corresponding lower slope that is generally parallel to the slope of upper ridge 42. Lower ridge 46 preferably has a slope angle $\theta_2$ inclined between 2 degrees and 10 degrees and more preferably approximately 5 degrees relative to the horizontal section of optical path 44 passing through objective end 18. Lower ridge 46 slopes to generally follow the converging path of light rays (not shown) entering spotting scope 10 through objective lens 16, thereby reducing the vertical height of right side major surface 34 proximal to eyepiece end 22 (between lower corner 38 and upper ridge 42), so that grasping region 30 is small enough to fit in the user's hand, as described above.

Skilled persons will understand that grasping region 30 may be made in any of a variety of other shapes that facilitate desirable ergonomic hand, arm, and wrist positions. Accordingly, grasping region 30 should not be construed as limited to the particular shape shown in FIGS. 1–3. For example, in one alternative embodiment lower corner 38 (FIGS. 2–3) may have a bulbous shape that is sized to contact a relatively small area of the concave portion of the user's palm. In other alternative embodiments, the grasping region is short enough so that one or more of the user's metacarpophalangeal joints rest along upper ridge 42. In still other alternative embodiments, upper ridge 42 may have a much larger or smaller radius around optical path 44 than is depicted in FIG. 3. The slopes of upper ridge 42 and lower ridge 46 may also be curved so that angles $\theta_1$ and $\theta_2$ vary along the length of housing 12.

With reference to FIGS. 1, 2, 3 and 10, a manually adjustable focusing knob 50 projects laterally from a left side 54 of housing 12 opposite grasping region 30. Focusing knob 50 is manually rotatable about an axis of rotation 56 to drive a movable optical element within housing 12 for adjusting a focus setting of spotting scope 10, as further described below with reference to FIGS. 5–7. Focusing knob 50 and axis of rotation 56 extend transversely of an optical axis 100 (FIG. 4) of objective lens 16 to define an included angle between axis of rotation 56 and optical axis 100 that is preferably 90°. The position of focusing knob 50, projecting from housing 12 transverse (and preferably perpendicular) to the direction that the spotting scope 10 is aimed when used to view a distant object (not shown), allows focusing knob 50 to be comfortably grasped and rotated with the user's left hand while maintaining the left forearm and wrist in an ergonomic position during manipulation of focusing knob 50. The ergonomic hand, wrist, and arm positions reduce arm fatigue and shaking of spotting scope 10 when using spotting scope 10 to view distant objects. Skilled persons will understand that the arrangement of housing 12 and focusing knob 50 can easily be reversed left-to-right for an alternative embodiment (not shown), in which the grasping region comprises a left side major surface for holding in a user's left hand and the focusing knob extends from the right side surface of the housing for grasping and rotating with the user's right hand. An alternative optical system (not shown) may also result in a different folding arrangement of folded optical path 44.

With reference to FIGS. 2 and 3, a lanyard mount 58 is formed in housing 12 and sized to allow a lanyard or strap to be threaded through lanyard mount 58 for carrying spotting scope 10 in the field. Lanyard mount 58 is recessed in housing 12 with a bar portion of lanyard mount 58 positioned at or below with the outer surface 28 of housing 12 and extending across a well formed in housing 12, which provides clearance for a lanyard or other strap as it passes around the bar. Housing 12, eyepiece assembly 20, and an objective tube 62 are preferably coated or covered with an elastomeric armor 90 (FIG. 4) that helps insulate the optical system from mechanical shock and generally protects spotting scope 10 from damage.

With reference to FIGS. 1 and 2, a threaded mounting hole 66 is provided near objective end 18 of housing 12. Mounting hole 66 provides an attachment point for securing spotting scope 10 to a tripod or other steady mount. However, spotting scope 10 is preferably of such a light weight and small size to be particularly suitable to hand-held use. For example, spotting scope 10 of the preferred embodiment may weigh less than 16 ounces (approximately 450 grams) and measure less than 8 inches (approximately 20 centimeters) in overall length. Spotting scope 10 also may feature variable optical power in the range of 10 to 20 times magnification, which is sufficiently low enough to make hand-held use possible with the steady support afforded by the ergonomic grasping region 30 and side mounted focusing knob 50. Other sizes, weights, and optical magnification powers may also be suitable for hand-held use. For example, another embodiment (not shown), with a larger objective and longer objective tube, provides variable optical magnification in the range of 15× to 30×, weighs slightly under 22 ounces (approximately 620 g), and has an overall length of approximately 10.2 inches (approximately 26 cm).

Mounting hole 66 also provides a convenient place for injecting dry nitrogen gas into housing 12 after assembly of spotting scope 10 to prevent condensation or fogging on lenses and other internal optical surfaces. After injection of the nitrogen gas, a filling opening (not shown) at the base of mounting hole 66 is sealed with a plug 68 (FIG. 5) to retain a charge of the nitrogen gas within housing 12.

Mounting hole 66 may also be used to attach an auxiliary device (not shown) such as a range finder, illumination device, laser pointer/marker, mounting adapter, bracket, hand strap, or cover, for example. For example, a tripod mounting adapter 72 (FIG. 5) is secured in mounting hole 66 with a machine screw 74. Tripod mounting adapter 72 includes a standard tripod mounting hole on its lower side (not shown) for attachment to a tripod or other steady mount. When mounting hole 66 is not in use, a removable cap (not shown) can be inserted or threaded into mounting hole 66 to prevent dust and debris from becoming lodged in mounting hole 66.

The small size and light weight of spotting scope 10 is achieved, in the preferred embodiment, using lightweight plastic materials wherever possible. For example, the preferred arrangement of housing 12 and an internal support member 120 (FIG. 7) are such that optical elements of spotting scope can be maintained in accurate alignment without the use of machined surfaces on solid metal supports common to prior-art spotting scopes.

Figure 5:
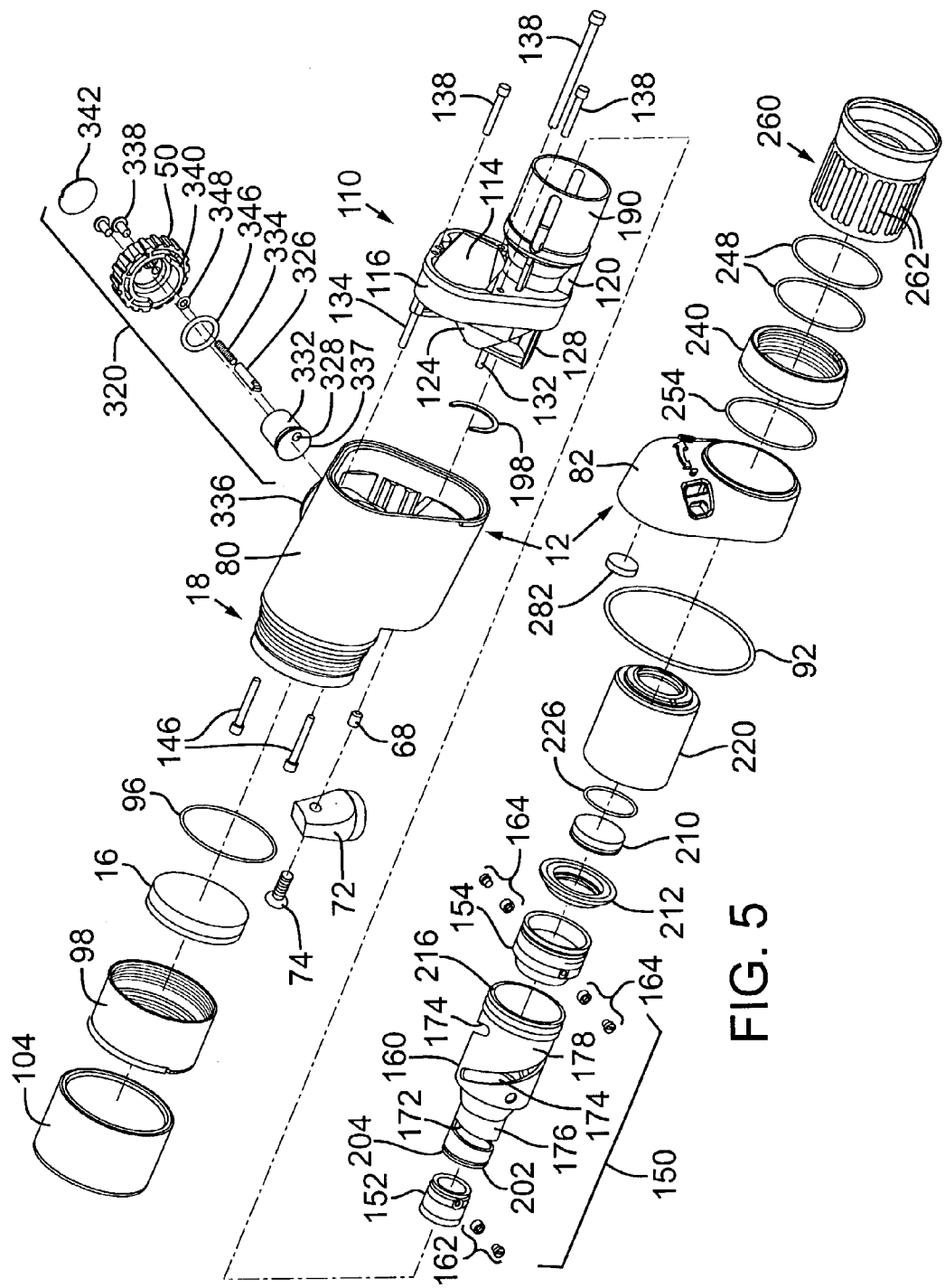
FIG. 5 is an exploded perspective view of the compact spotting scope of FIG. 1 (reduced scale)

FIG. 4 is a cross section view of compact spotting scope 10 taken along lines 4—4 of FIG. 3. FIG. 5 is an exploded perspective view of spotting scope 10. With reference to FIGS. 4 and 5, housing 12 includes a main housing portion 80 and an eyepiece housing portion 82 that fit together along an interface 84. Main and eyepiece housing portions 80 and 82 preferably include structural cores 86 and 88, respectively, over which an elastomeric armor coating 90 is applied by overmolding or another suitable manufacturing process.

Structural cores 86 and 88 are preferably made of an injection molded glass-filled thermoplastic resin for high strength and reduced weight and cost. Other structural materials may also be used, and need not be molded. A gasket 92 fits in a groove in interface 84 to provide a gas-tight seal between main housing portion 80 and eyepiece housing portion 82. Gasket 92 is preferably made of an elastomeric material such as buna-N, rubber, or silicone.

A circumference inner lip 94 is formed in main core 86 at objective end 18 for supporting objective lens 16 on housing 12. Objective lens 16 is preferably a cemented doublet, but other lens types may be appropriate in a different optical design. An objective O-ring 96 (FIG. 5) is interposed between objective lens 16 and main housing portion 80 for providing a gas-tight seal. An objective lock ring 98 is threaded onto objective end 18 of main housing portion 80 to secure objective lens 16 in place. Objective lens 16 includes an optical axis 100 that extends through the centers of curvature of the optical surfaces of objective lens 16 and generally toward a distant object to be viewed using spotting scope 10. Objective lock ring 98 may include filter threads 102 for attaching optional optical filters or accessories to objective end 18. An armored sleeve 104 is fitted around lock ring 98 and may be made of an elastomeric material similar to that used for armor coating 90. To achieve a desired level of durability, lock ring 98 is preferably machined of metal and armored sleeve 104 is preferably attached by stretching and slipping armored sleeve 104 over lock ring 98. However, lock ring 98 may also be formed of injection molded plastic or another structural material and armored sleeve 104 may be secured with adhesive or overmolded directly onto lock ring 98.

A prism assembly 110 is preassembled before installation in main housing portion 80. Prism assembly 110 includes a stationary prism 114 mounted to a frame portion 116 of a support member 120. An optical focusing element such as a movable prism 124 is supported in a carriage 128, which is slidably mounted on a pair of guide pins 132 and 134. To reduce weight, simplify manufacturing, and reduce cost, support member 120 and carriage 128 are preferably formed of molded material, such as injection molded plastic, molded metal, or die-cast metal. Other inexpensive lightweight structural materials and manufacturing methods may also be used. Guide pins 132 and 134 are supported at one end by support member 120. After installation of prism assembly 110 in housing 12, guide pins 132 and 134 are supported at their other ends by main housing portion 80. A partition 140 of main housing portion 80 extends longitudinally within housing 12. Partition 140 shields movable prism 124 and half of stationary prism 114 from stray light entering through objective 16. Prism assembly 110 is secured to main housing portion 80 by a set of three screws 138. Screws 138 extend through holes 142 (FIG. 8) in frame portion 116 and are threaded into threaded metal inserts (not shown) molded into core 86 of main housing portion 80. With reference to FIG. 4, frame portion 116 of support member 120 is seated firmly against a ledge 144 formed in core 86 of main housing portion 80. Ledge 144 accurately locates stationary prism 114 relative to objective lens 16.

Eyepiece housing portion 82 is assembled after screws 138 have been tightened. Eyepiece housing portion 82 fits snugly around frame portion 116 of support member 120 and closely mates with main housing portion 80 along interface 84 (FIG. 4). A pair of cover screws 146 are inserted through mounting holes 148 in ledge 144 and frame portion 116 of (FIG. 8), and threaded into a pair of metal threaded inserts (not shown), which are molded inside core 88 of eyepiece housing portion 82. Before installation of objective lens 16, cover screws 146 are tightened using a screwdriver or other tool inserted through the open objective end 18 of housing 12. Cover screws 146 draw eyepiece housing portion 82 toward main housing portion 80 to tightly clamp and compress gasket 92 therebetween for a gas-tight seal. Objective lens 16 and objective lock ring 98 are installed after cover screws 146 have been tightened.

Stationary and movable prisms 114 and 124 are preferably porro prisms. However, other types of optical beam directing elements (also referred to herein as beam steering elements, beam reflecting elements, and beam folding and reflecting elements), such as roof prisms, other types of prisms, and/or mirrors may also be used to create folded optical path 44. While movable prism 114 is preferably driven to adjust a focus setting of spotting scope, skilled persons will appreciate that prism assembly 110 and a movable optical element of it may be configured or arranged in various other ways not shown, while accomplishing one or more optical functions. For example, prism assembly 110 may include a different type of movable optical element, such as one or more refractive optical elements. Such a movable optical element may be adjustable for focusing and/or for another optical purpose, such as optical power adjustment, for example. Additional details and embodiments of prism assembly 110 are discussed below with reference to FIGS. 6–9.

Turning again to FIGS. 4 and 5, an optical power adjustment assembly 150 includes movable first and second lens modules 152 and 154 slidably supported within a rotatable tubular cam sleeve 160. Power adjusting lens assembly 150 preferably utilizes a mechanism for differential movement of first and second lens modules 152 and 154, which is similar to the mechanism described in U.S. Pat. No. 3,058,391 of Leupold, issued Oct. 16, 1962, incorporated herein by reference. Lens modules 152 and 154 include respective cam followers 162 and 164 (second lens module 154 includes two cam followers 164), which are operably engaged with respective first and second helical cam slots 172 and 174 formed in cam sleeve 160. First cam slot 172 preferably comprises a single helical slot in which a single cam follower 162 rides, whereas second cam slot 174 includes an opposing pair of helical slots in which a pair of cam followers 164 ride. First and second lens modules 152 and 154 are rotatably constrained so that they follow a generally linear path along longitudinal axis 194 in response to rotation of cam sleeve 160, to thereby adjust an optical magnification setting of spotting scope 10. Arrow and circle indicia 24 are preferably molded into armor coating 90 of eyepiece housing portion 82 to provide a visual indicator of the directions in which to rotate cam sleeve 160 for increasing and decreasing the optical magnification setting of spotting scope 10.

Cam sleeve 160 is preferably stepped to include a minor diameter 176 and a major diameter 178 that follow the stepped shape of a tubular portion 190 of support member 120. Cam sleeve 160, including minor and major portions 176 and 178, is preferably machined of a single piece of metal or tubing to provide wear resistance and dimensional accuracy for precise operation of lens assembly 150. Cam sleeve 160 is preferably made of metal for durability and wear resistance of first and second cam grooves 172 and 174, but may, alternatively, be formed of another material such as injection molded plastic. Lens assembly 150 is supported within tubular portion 190 of support member 120 such that cam sleeve 160 is rotatable about a longitudinal axis 194 of tubular portion 190. After lens assembly 150 is installed in support member 120 and before support member 120 is installed in housing 12, a snap ring 198 is attached in a groove 202 at a narrow end 204 of minor diameter portion 176 of cam sleeve 160 to retain cam sleeve 160 in tubular portion 190.

First and second lens modules 152 and 154 may include singlets, doublets, or other lens types in various combinations and are preferably of an optical design that maintains the focus of spotting scope 10 constant throughout the range of optical magnification adjustment afforded by power-adjusting lens assembly 150. The specific prescriptions of the lenses used in lens assembly 150, objective 16, and other lenses and optical elements of spotting scope 10 may be determined by the dimensions and optical performance requirements of spotting scope 10. The lenses and prisms of spotting scope 10 are preferably made of optical glass for high resolution imaging, but may, alternatively, be made of plastic or another material to further reduce the weight and manufacturing cost of spotting scope 10.

In accordance with the principles described in U.S. Pat. No. 3,058,391, first and second lens modules 152 and 154 are constrained to prevent them from rotating about longitudinal axis 194 so that first and second lens modules 152 and 154 move along longitudinal axis 194 in response to rotation of cam sleeve 160. With reference to FIGS. 4 and 5, first and second cam followers 162 and 164 extend outwardly through respective first and second cam grooves 172 and 174 to slidably engage longitudinal guide features 206 (FIGS. 7 and 9) of tubular portion 190, which inhibit rotation of first and second lens modules 152 and 154 about longitudinal axis 194. First and second helical cam grooves 172 and 174 may have the same pitch, to thereby drive first and second lens modules 152 and 154 at the same linear rate of movement in response to rotation of cam sleeve 160. However, in a preferred embodiment, the pitches of first and second helical cam grooves of 172 and 174 are different, so that first and second lens modules 152 and 154 are driven in concert at different rates of linear movement along longitudinal axis 194, as is typically necessary to maintain the focus of spotting scope 10 throughout the range of magnification adjustment.

An ocular lens 210 is seated in a lens holder 212 at a wide end 216 of major diameter portion 178 of cam sleeve 160. An eyepiece tube 220 is threaded onto cam sleeve 160 via threads 222 and secures ocular lens 210 in place at wide end 216 of cam sleeve 160. An ocular O-ring 226 is interposed between ocular lens 210 and lens holder 212. An eyepiece holder O-ring 228 (FIG. 4) is interposed between lens holder 212 and eyepiece tube 220. The ocular O-ring 226 and eyepiece holder O-ring 228 prevent moisture from entering housing 12 around ocular lens 210 and provide a gas-tight seal for maintaining a dry nitrogen gas charge inside spotting scope 10 to prevent condensation and fogging on internal optical surfaces.

An eyepiece lock ring 240 is threadably attached to tubular portion 116 of support member 120 via threads 242 and tightened to help clamp eyepiece housing portion 82 against main housing portion 80 along interface 84. Eyepiece lock ring 240 includes an opening that is slightly larger than the outer diameter of eyepiece tube 220, so that eyepiece lock ring 240 can be installed over eyepiece tube 220. A pair of inner circumferencial grooves 244 are formed in eyepiece lock ring 240 and sized to fit a pair of eyepiece tube O-rings 248, which provide a dynamic gas-tight seal around eyepiece tube 220 without restricting rotation of eyepiece tube 220. To reduce friction, lubrication may be applied between eyepiece tube 220 and eyepiece tube O-rings 248. A lock ring O-ring 254 is interposed between eyepiece lock ring 240 and eyepiece housing portion 82 and compressed to provide a gas-tight seal therebetween. After installation of eyepiece lock ring 240, an elastomeric eyepiece cup 260 is securely fitted around eyepiece tube 220. Eyepiece cup 260, which is preferably formed of a resilient elastomeric material, may have sufficient resiliency to provide a tight non-slip fit around eyepiece tube 220. Adhesive may also be applied between eyepiece tube 220 and eyepiece cup 260 to securely attach eyepiece cup 260. Eyepiece cup 260 includes raised outer ribbing 262 for facilitating gripping and manual rotation of eyepiece tube 220 for adjusting the magnification setting of spotting scope 10.

Eyepiece tube 220 and eyepiece lock ring 240 are preferably machined of metal for dimensional accuracy, strength, durability, and wear resistance. The enhanced strength of metal shields the relatively thin tubular portion 190 of support member 120 to protect it from damage. The use of metal for eyepiece tube 220 also allows the outer surface of eyepiece tube 220 to be made very smooth to reduce friction as eyepiece tube 220 slides against eyepiece tube O-rings 248. While less preferable, eyepiece tube 220 and eyepiece lock ring 240 may also be made of plastic or one or more other structural materials.

Figure 6:
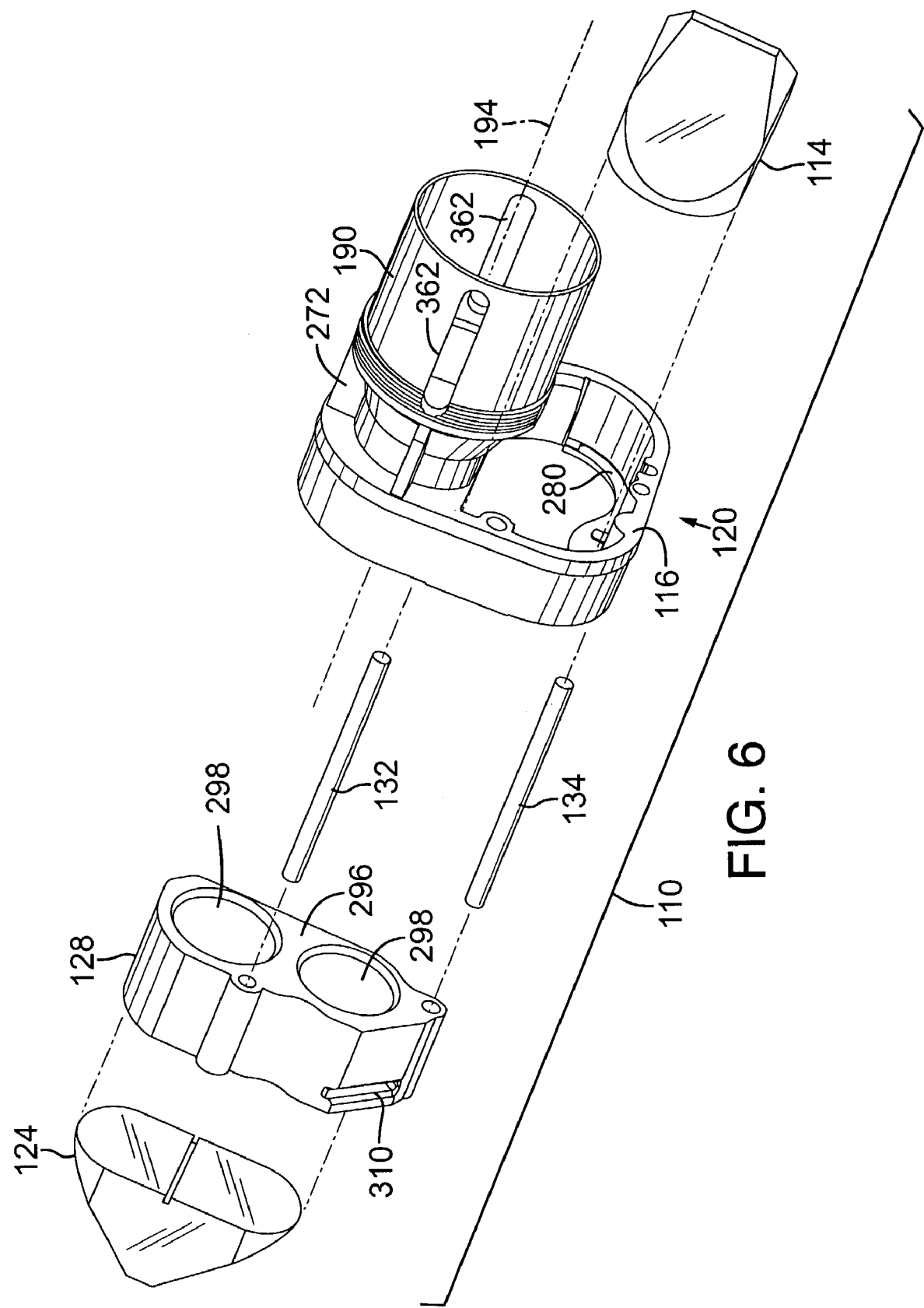
FIG. 6 is an exploded perspective view of a support member and prism assembly of the compact spotting scope of FIGS. 4 and 5.

FIG. 6 is an exploded left-side perspective view of prism assembly 110 of spotting scope 10. FIG. 7 is a pictorial view of prism assembly 110 shown from a lower right vantage and with movable prism 124 and carriage 128 spaced apart from stationary prism 114 and support member 120. FIG. 8 is an eyepiece end elevation view of prism assembly 110, and FIG. 9 is a cross-section view of prism assembly 110 taken along line 9—9 of FIG. 8. In FIG. 9, movable prism 124 and carriage 128 are shown positioned adjacent support member 120. With reference to FIGS. 6–9, support member 120 includes frame portion 116 and tubular portion 190, which are preferably formed together of unitary one-piece construction. The complex shape of support member 120 is inexpensively manufactured by molding, for example injection molding of plastic resin, metal injection molding, casting, sintering, and other similar methods of manufacture. Molding the support member 120 as an integrated unit results in accurate alignment of tubular portion 190 relative to frame portion 116 for precisely supporting optical elements in and/or along the folded optical path 44. Integration of frame portion 116 and tubular portion 190 also reduces the number of parts that must be assembled, which reduces manufacturing cost and overall weight of spotting scope 10. Tubular portion 190 may have a wall thickness that is considerably thinner than the thickness of the walls of frame portion 116. One or more ribs 272 around tubular portion 190 connect tubular portion 190 to frame portion 116 to provide structural support for the thinner tubular portion 190 and the power-adjusting lens assembly 150 it supports. Ribs 272 enhance the overall structural rigidity of support member 120, which may help to maintain accurate alignment of prisms 114 and 124 and power-adjusting lens assembly 150 along optical path 44.

Frame portion 116 of support member 120 includes a seat 280 against which stationary prism 114 is securely seated. To ensure precise alignment of stationary prism 114 relative to optical path 44 and to other optical elements of spotting scope 10, support member 120 may be placed in an assembly fixture (not shown) that is used to establish a precise lateral position of stationary prism 114 relative to support member 120 before applying a drop of epoxy (not shown) between stationary prism 114 and frame portion 116 to secure them together. A compressible pad 282 (FIG. 5) is installed inside eyepiece housing portion 82 and presses against stationary prism 114 to help secure stationary prism in place. Pad 282 is preferably made of polyurethane foam and attached to eyepiece housing portion 82 using a pressure-sensitive adhesive. Guide pins 132 and 134 are preferably press fit into frame portion 116, but other mounting methods may also be used. Movable prism 124 is mounted in carriage 128, which is slidably supported on guide pins 132 and 134 for movement in response to adjustment of focusing knob 50, as explained below. Movable prism 124 is retained in carriage 128 by an integrally molded resilient spring arm 292 of carriage 128. Spring arm 292 presses against movable prism 124 to urge it against a platform portion 296 of carriage 128. Platform portion 296 includes a pair of windows 298 through which the optical image path passes when entering and exiting movable prism 124.

After movable prism 124 is installed in carriage 128, the lateral position of movable prism 124 is adjusted relative to carriage 128 to ensure precise alignment of stationary and movable prisms 114 and 124. Both stationary and movable prisms 114 and 124 may be adjusted in this manner in conjunction with a test and alignment fixture (not shown) to ensure their precise alignment with each other and relative to longitudinal axis 194 (FIG. 4) of tubular portion 190. Prealignment of prisms 114 and 124 ensures precise alignment of optical path 44 with power-adjusting lens assembly 150 (FIG. 4) when power-adjusting lens assembly 150 is installed in tubular portion 190. After alignment of movable prism 124, a drop of epoxy 302 (FIG. 7) or other similar substance is applied over spring arm 292 and a top ridge of movable prism 124 to secure movable prism 124 in place on carriage 128.

Guide pins 132 and 134 and main housing portion 80 accommodate a travel path of movable prism 124 that is sufficiently long enough to provide superior close focus capabilities. In a preferred embodiment, spotting scope 10 can be focused for viewing objects as close as 10 feet (3 meters) and more preferably as close as 6 feet (1.8 meters). Such close focus capabilities are particularly useful for viewing birds, flowers, and other plants and animals in the field.

With reference to FIG. 6, carriage 128 includes a focusing slot 310 that extends transversely of guide pins 132 and 134 and longitudinal axis 194. Focusing slot 310 is employed in a focus adjustment mechanism 320 (FIG. 5), which is similar to the mechanism described in U.S. Pat. No. 4,643,542 of Gibson, issued Feb. 17, 1987, incorporated herein by reference. Turning now to FIG. 5, focus adjustment mechanism 320 includes a radially offset drive pin 326 that is moved orbitally in response to rotation of adjustment knob 50 of focus adjustment mechanism 320 about its axis of rotation 56 (FIG. 4). Drive pin 326 extends through a bore 328 of a focusing shaft 332 of focus adjustment mechanism 320 and is urged into engagement with focusing slot 310 by a spring 334 interposed between drive pin 326 and focusing knob 50. Focusing shaft 332 is installed from inside housing 12 through an aperture (not shown) in a turret 336 (FIG. 3) of main housing portion 80. A flange 337 of focusing shaft 332 is larger than the aperture of turret 336 and retains focus adjustment mechanism 320 on housing 12. Focusing knob 50 is fastened to focusing shaft 332 by a pair of screws 338. A stop 340 formed on the proximal side of focusing knob 50 engages with a corresponding stop groove (not shown) in turret 336 to limit the range of rotation of focusing knob 50 and the corresponding range of orbital movement of drive pin 326. A cap 342 is applied to focusing knob 50 over screws 338 to enhance the aesthetic appearance of focusing knob 50 and to prevent tampering with screws 338. Cap 342 may be secured with adhesive or by a mechanical fit with focusing knob 50. Resilient seals 346 and 348 are provided for ensuring a gas-tight seal between housing 12 and focus adjustment mechanism 320.

In response to orbital movement of drive pin 326, carriage 128 is driven along guide pins 132 and 134 to adjust the focus setting of spotting scope 10 in accordance with the principles described in U.S. Pat. No. 4,643,542. The orbital path of drive pin 326 results in a relative carriage velocity that varies depending on the position of adjustment knob 50 and drive pin 326. For example, carriage 128 moves quickly as drive pin 326 reaches the top of its orbital path, where drive pin 326, focusing slot 310, and a rotational axis of focus adjustment mechanism 320 are in alignment. As drive pin 326 reaches its longitudinal extremes (where focusing slot 310 is tangential to the orbital path of drive pin 326), carriage 128 moves more slowly in response to rotation of focusing knob 50. Such a variable velocity profile may advantageously allow a user to find the proper focus setting more quickly than with jack screw mechanisms used in prior art spotting scopes. A variable velocity profile is particularly useful with the close focus capabilities of the preferred embodiment. Other focus adjustment mechanisms may also be used. For example, in an alternative embodiment focus adjustment mechanism may comprise a spiral cam mechanism of the type described in U.S. Pat. No. 6,351,907 of Otteman, issued Mar. 5, 2002, which is incorporated herein by reference.

While adjustment mechanism 320 is used in the preferred embodiment to adjust a focus setting of spotting scope 10, it may serve other purposes in alternative embodiments (not shown). For example, an alternative adjustment mechanism may be used for controlling the optical power setting of spotting scope 10. Skilled persons will appreciate that other mechanical and electromechanical couplings may be implemented for accomplishing other optical and non-optical adjustments in spotting scope 10. Regardless of the type of adjustment accomplished with adjustment mechanism 320, the side-mounted location of knob 50 and turret 336 facilitate steady hand-held use of spotting scope 10, as described above with reference to FIGS. 3 and 10.

Turning again to FIGS. 6–9, tubular portion 190 of support member 120 includes guide features 206 for guiding first and second lens modules 152 and 154 of power-adjusting lens assembly 150. In the preferred embodiment shown, guide features 206 include an opposing pair of elongate guide slots 362 extending longitudinally along the larger diameter section of tubular portion 190. Guide slots 362 are sized to closely and slidably receive second cam followers 164 of second lens module 154. Guide features 206 also preferably include a single guide channel 368 molded along the inside surface of the minor diameter section of tubular portion 190. Guide channel 368 is sized to closely and slidably receive first cam follower 162 of first lens module 152. Guide features 206 are preferably integrally molded into support member 120 to reduce the weight and manufacturing cost of spotting scope 10. Skilled persons will understand that guide features 206 need not comprise slots or channels, but may include, in alternative embodiments (not shown), raised features such as rails or other longitudinally aligned surfaces against which a cam follower can be guided.

Other optical elements may be used in place of stationary and movable prisms 114 and 124 of prism assembly 110. For example, another type of beam directing element, such as a collection of precisely aligned mirrors, may be used to accomplish similar results. Accordingly, stationary and movable prisms 114 and 124 represent only one type of the fixed and movable beam directing elements, respectively, which may be used in the preferred embodiments. Support member 120 and carriage 128 might also be useful and advantageous in connection with other beam directing elements, such as a roof prism assembly (not shown), or with refractive optical elements or lenses.

It will be obvious to those having skill in the art that many other changes may be made to the details of the above-described embodiments without departing from the underlying principles of the invention. The scope of the present invention should, therefore, be determined only by the following claims.

The invention claimed is:

1. A hand-held spotting scope, comprising:
an optical system defining a folded optical path, the optical system including a movable optical element and an objective lens, the objective lens having an optical axis;
a housing supporting the optical system; and
an adjustment knob operably coupled to the movable optical element and manually rotatable about an axis of rotation for displacing the movable optical element to thereby adjust an optical setting of the spotting scope, the axis of rotation of the adjustment knob extending transversely of the optical axis of the objective to facilitate steady support of the spotting scope and adjustment of the optical setting when using the spotting scope to view an object.

2. The spotting scope of claim 1, in which movement of the optical element in response to rotation of the adjustment knob changes a focus setting of the spotting scope.

3. The spotting scope of claim 1, in which the housing includes an outer surface having a grasping region positioned adjacent the folded optical path and sized for grasping with one hand so that the spotting scope is supportable at eye level with one hand, in an ergonomic arm and wrist position, for viewing the object through the spotting scope; and
the adjustment knob projects from the outer surface of the housing opposite the grasping region for grasping and rotating with the user's other hand during viewing of the object through the spotting scope, thereby facilitating steady support of the spotting scope when in use.

4. The spotting scope of claim 3, in which the user's arm and wrist corresponding to the user's other hand can be held in an ergonomic position when the adjustment knob is grasped with the other hand and the object is viewed through the spotting scope.

5. The spotting scope of claim 1, further comprising a support member located within the housing for precisely supporting and positioning multiple optical elements, the support member including:
a generally tubular portion having a longitudinal axis and at least one guide feature formed therein for guiding a first optical element of the spotting scope for movement along the longitudinal axis; and
a frame portion integrally formed of unitary construction with the tubular section and including a seat sized to fit at least one optical beam directing element for rigidly seating the optical beam directing element at a precise position relative to the longitudinal axis.

6. The spotting scope of claim 5, in which the frame portion and the tubular portion are integrally formed of unitary one-piece construction.

7. A hand-held spotting scope, comprising:
an optical system defining a folded optical path, the optical system including a movable optical element and an objective lens, the objective lens having an optical axis;
a housing supporting the optical system, the housing including an outer surface having a grasping region positioned adjacent the folded optical path and sized for grasping with one hand so that the spotting scope is supportable at eye level with one hand of a user, in an ergonomic arm and wrist position; and
a manually rotatable adjustment knob projecting from the outer surface of the housing opposite the grasping region in a direction transversely of the optical axis of the objective lens, the adjustment knob operably coupled to the movable optical element for displacing the movable optical element in response to rotation of the adjustment knob to thereby adjust an optical setting of the spotting scope, the adjustment knob sized and positioned for grasping and rotating with the user's other hand, thereby facilitating steady support of the spotting scope during adjustment of the optical setting.

8. The spotting scope of claim 7, in which the user's arm and wrist corresponding to the user's other hand can be held in an ergonomic position when the adjustment knob is grasped with the other hand.

9. The spotting scope of claim 7, in which the grasping region includes a radiused lower corner that nests in a concave region of the palm of the user's hand when the user grasps the spotting scope.

10. The spotting scope of claim 7, in which displacement of the movable optical element in response to rotation of the adjustment knob changes a focus setting of the spotting scope.

11. The spotting scope of claim 7, in which the adjustment knob drives the movable optical element at a velocity that varies with the rotational position of the adjustment knob.

12. The spotting scope of claim 7, in which the spotting scope has an overall length of less than 8 inches.

13. The spotting scope of claim 12, in which the spotting scope weighs less than 16 ounces.

14. The spotting scope of claim 7, in which the housing includes a lanyard mount for attaching a carrying strap to the spotting scope.

15. The spotting scope of claim 7, further comprising a power-adjusting lens assembly operable for manual adjustment of an optical power of the spotting scope.

16. The spotting scope of claim 15, further comprising a rotatable eyepiece assembly, the eyepiece assembly operably coupled to the power-adjusting lens assembly for adjusting the optical power of the spotting scope in response to rotation of the eyepiece assembly.

17. The spotting scope of claim 7, wherein the movable optical element comprises a porro prism.

18. The spotting scope of claim 7, wherein the movable optical element comprises a refractive optical element.

19. The spotting scope of claim 7, wherein the movable optical element comprises a lens.

20. The spotting scope of claim 7, further comprising a set of optical beam directing elements supported within the housing.

21. The spotting scope of claim 20, in which the movable optical element is included in the set of optical beam directing elements.

22. The spotting scope of claim 20, in which the set of optical beam directing elements includes a prism.

23. A spotting scope in accordance with claim 7, having a close focus distance of less than 30 feet.

24. A spotting scope in accordance with claim 7, having a close focus distance of less than 10 feet.

25. The spotting scope of claim 7, further comprising a support member located within the housing for precisely supporting and positioning multiple optical elements, the support member including:
   a generally tubular portion having a longitudinal axis and at least one guide feature formed therein for guiding a first optical element of the spotting scope for movement along the longitudinal axis; and
   a frame portion integrally formed of unitary construction with the tubular section and including a seat sized to fit at least one optical beam directing element for rigidly seating the optical beam directing element at a precise position relative to the longitudinal axis.

26. The spotting scope of claim 25, in which the frame portion and the tubular portion are integrally formed of unitary one-piece construction.

27. In a spotting scope of the type having an objective end and an eyepiece end, and an optical system including an objective lens mounted at the objective end and having an optical axis, an ocular lens mounted at the eyepiece end, and at least one optical element movably supported between the eyepiece end and the objective end for adjusting an optical setting of the spotting scope, the optical system defining a folded optical path between the objective lens and the ocular lens, the improvement comprising:
   a housing supporting the optical system, the housing including an outer surface sized and shaped to contain the folded optical path and to enable a user to support the spotting scope at eye level with one hand, in an ergonomic arm and wrist position, for viewing an object through the spotting scope; and
   a manually rotatable side-mounted adjustment knob having an axis of rotation extending transversely of the optical axis of the objective lens, the adjustment knob operably coupled to the optical element for moving the optical element in response to rotation of the adjustment knob to thereby adjust the optical setting of the spotting scope, the adjustment knob positioned along a side of the housing opposite where the housing is held by the user's one hand for grasping and rotating the adjustment knob with the user's other hand to thereby facilitate steady and comfortable support of the spotting scope when viewing the object through the spotting scope.

28. The spotting scope of claim 27, in which the user's arm and wrist corresponding to the user's other hand can be held in an ergonomic position when the adjustment knob is grasped with the other hand.

29. The spotting scope of claim 27, in which the outer surface includes a radiused lower corner that nests in a concave region of the palm of the user's hand when the user grasps the spotting scope.

30. The spotting scope of claim 27, in which movement of the optical element in response to rotation of the adjustment knob changes a focus setting of the spotting scope.

31. The spotting scope of claim 27, in which the adjustment knob drives the optical element at a velocity that varies with the rotational position of the adjustment knob.

32. The spotting scope of claim 27, in which the spotting scope has an overall length of less than 8 inches.

33. The spotting scope of claim 32, in which the spotting scope weighs less than 16 ounces.

34. The spotting scope of claim 27, in which the housing includes a lanyard mount for attaching a carrying strap to the spotting scope.

35. The spotting scope of claim 27, further comprising a power-adjusting lens assembly operable for manual adjustment of an optical power of the spotting scope.

36. The spotting scope of claim 35, further comprising a rotatable eyepiece assembly, the eyepiece assembly operably coupled to the power-adjusting lens assembly for adjusting the optical power of the spotting scope in response to rotation of the eyepiece assembly.

37. The spotting scope of claim 27, wherein the optical element comprises a porro prism.

38. The spotting scope of claim 27, further comprising:
   a molded support member supported within the housing, the molded support member including a frame portion and a generally tubular portion, the tubular portion having a longitudinal axis and at least one guide feature extending along the longitudinal axis;
   a first optical beam directing element rigidly seated on the frame portion in precise alignment relative to the tubular portion;
   a second optical beam directing element movably supported on the frame portion in precise alignment relative to the tubular portion and the first beam directing element; and
   at least one optical element slidably mounted within the tubular portion of the support member, the optical element including a guide piece operably engaged with the guide feature of the support member for guiding movement of the optical element along the longitudinal axis of the tubular portion.

39. The spotting scope of claim 27, further comprising a support member located within the housing for precisely supporting and positioning multiple optical elements, the support member including:
   a generally tubular portion having a longitudinal axis and at least one guide feature formed therein for guiding a first optical element of the spotting scope for movement along the longitudinal axis; and
   a frame portion integrally formed of unitary construction with the tubular section and including a seat sized to fit at least one optical beam directing element for rigidly seating the optical beam directing element at a precise position relative to the longitudinal axis.

40. The spotting scope of claim 39, in which the frame portion and the tubular portion are integrally formed of unitary one-piece construction.

* * * * *